United States Patent
Lin et al.

(10) Patent No.: US 9,511,354 B2
(45) Date of Patent: Dec. 6, 2016

(54) METHOD FOR OXIDIZING CARBONACEOUS MATERIAL DIESEL PARTICULATE FILTER AND EXHAUST GAS SYSTEM

(71) Applicant: GENERAL ELECTRIC COMPANY, Schenectady, NY (US)

(72) Inventors: Chuan Lin, ShangHai (CN); Youhao Yang, ShangHai (CN); Qijia Fu, ShangHai (CN); Xubin Gao, Shanghai (CN); Xiao Zhang, ShangHai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 85 days.

(21) Appl. No.: 14/210,590

(22) Filed: Mar. 14, 2014

(65) Prior Publication Data

US 2014/0271430 A1  Sep. 18, 2014

(30) Foreign Application Priority Data

Mar. 15, 2013 (CN) .......................... 2013 1 0084607

(51) Int. Cl.
*B01J 23/888* (2006.01)
*B01J 23/00* (2006.01)
(Continued)

(52) U.S. Cl.
CPC ............ *B01J 23/888* (2013.01); *B01D 53/944* (2013.01); *B01J 23/002* (2013.01); *B01J 23/30* (2013.01);
(Continued)

(58) Field of Classification Search
None
See application file for complete search history.

(56) References Cited

U.S. PATENT DOCUMENTS 4,759,918 A  7/1988 Homeier et al.
4,900,517 A  2/1990 Domesle et al.
(Continued)

FOREIGN PATENT DOCUMENTS

CN  101391164 A  3/2009
CN  100490949 C  5/2009
(Continued)

OTHER PUBLICATIONS

Boldyreva et al(Effect of Pt, Pd, and Cs+ Additives on the Surface State and Catalytic Activity of WO3 in Oxidation of Hydrogen, Theoretical and Experimental Chem, vol. 41, No. 2, (2005) 135-138).*

(Continued)

*Primary Examiner* — Melvin C Mayes
*Assistant Examiner* — Michael Forrest
(74) *Attorney, Agent, or Firm* — GE Global Patent Operation; Peter T. DiMauro

(57) ABSTRACT

A method for oxidizing a carbonaceous material, the method comprising contacting the carbonaceous material with an effective amount of a catalytic material of formula $A_xM_y\text{-}WO_z$, and initiating the oxidization of the carbonaceous material at a first temperature lower than a second temperature at which the carbonaceous material is initiated to oxidize without a catalyst, wherein A is at least one of cesium and potassium, M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth, $0 \leq x \leq 1$, $0 \leq y \leq 1$, $2.2 \leq z \leq 3$, when $x=0$, $y>0$, and when $y=0$, $x>0$.

20 Claims, 10 Drawing Sheets

(51) Int. Cl.
| | |
|---|---|
| *B01J 23/30* | (2006.01) |
| *B01J 23/31* | (2006.01) |
| *B01J 35/00* | (2006.01) |
| *B01D 53/94* | (2006.01) |
| *F01N 3/28* | (2006.01) |
| *B01J 23/652* | (2006.01) |
| *B01J 23/68* | (2006.01) |

(52) U.S. Cl.
CPC ............... *B01J 23/31* (2013.01); *B01J 35/002* (2013.01); *F01N 3/2803* (2013.01); *B01D 2255/202* (2013.01); *B01D 2255/2022* (2013.01); *B01D 2255/2047* (2013.01); *B01D 2255/2065* (2013.01); *B01D 2255/2096* (2013.01); *B01D 2255/20746* (2013.01); *B01D 2255/40* (2013.01); *B01D 2255/9155* (2013.01); *B01D 2258/012* (2013.01); *B01J 23/6527* (2013.01); *B01J 23/687* (2013.01); *B01J 2523/00* (2013.01)

(56) References Cited

U.S. PATENT DOCUMENTS

| | | | |
|---|---|---|---|
| 5,665,322 A | 9/1997 | Kiyohide et al. | |
| 6,110,860 A * | 8/2000 | Inoue et al. ......... | B01D 53/945 502/217 |
| 6,749,702 B1 | 6/2004 | Knowlton et al. | |
| 7,740,817 B2 | 6/2010 | Matsumoto et al. | |
| 7,758,832 B2 | 7/2010 | O'Sullivan et al. | |
| 7,797,931 B2 | 9/2010 | Dubkov et al. | |
| 2010/0081569 A1 | 4/2010 | Sepeur et al. | |
| 2012/0014842 A1 | 1/2012 | Dornhaus et al. | |
| 2012/0121486 A1 | 5/2012 | Collier et al. | |

FOREIGN PATENT DOCUMENTS

| | | |
|---|---|---|
| EP | 1256382 A2 | 11/2002 |
| EP | 1923134 A1 | 5/2008 |
| JP | 2003120265 A | 4/2003 |
| WO | 2012041455 A1 | 4/2012 |

OTHER PUBLICATIONS

Oi et al("Hexagonal and Pyrochlore-Type Cesium Tungstates Sysnthesized from Cesium Peroxo-Polytungstate and their Intercalation Chemistry", Solid State Ionics, Jan. 1, 1994, pp. 204-208, vol. No. 72.*

Junko, Oi, et al., "Hexagonal and Pyrochlore-Type Cesium Tungstates Sysnthesized from Cesium Peroxo-Polytungstate and their Intercalation Chemistry", Solid State Ionics, Jan. 1, 1994, pp. 204-208, vol. No. 72.

Hussain, Altaf, "Phase Analyses of Potassium, Rubidium and Cesium Tungsten Bronzes", Acta Chemica Scandinavica, pp. 479-484, Jan. 1, 1978, vol. No. 32.

Laruelle, Stephane, et al., "High-Energy Milling of WO3 Oxides: Amorphization and Reaction with Cs2CO3", Journal of Solid State Chemistry, Jan. 1, 1994, pp. 172-177.

EP Search Report and Written Opinion issued May 26, 2014 in connection with corresponding EP Patent Application No. 14159419.2.

Teraoka et al., "Simultaneous removal of nitrogen oxides and dieselsoot particulates catalyzed by perovskite-type oxides", Applied Catalysis B: Environmental, vol. 5, Issue 3, pp. L181-L185, Feb. 11, 1995.

Unofficial English translation of Office Action issued in connection with corresponding CN Application No. 201310084607.8 on Aug. 24, 2015.

* cited by examiner

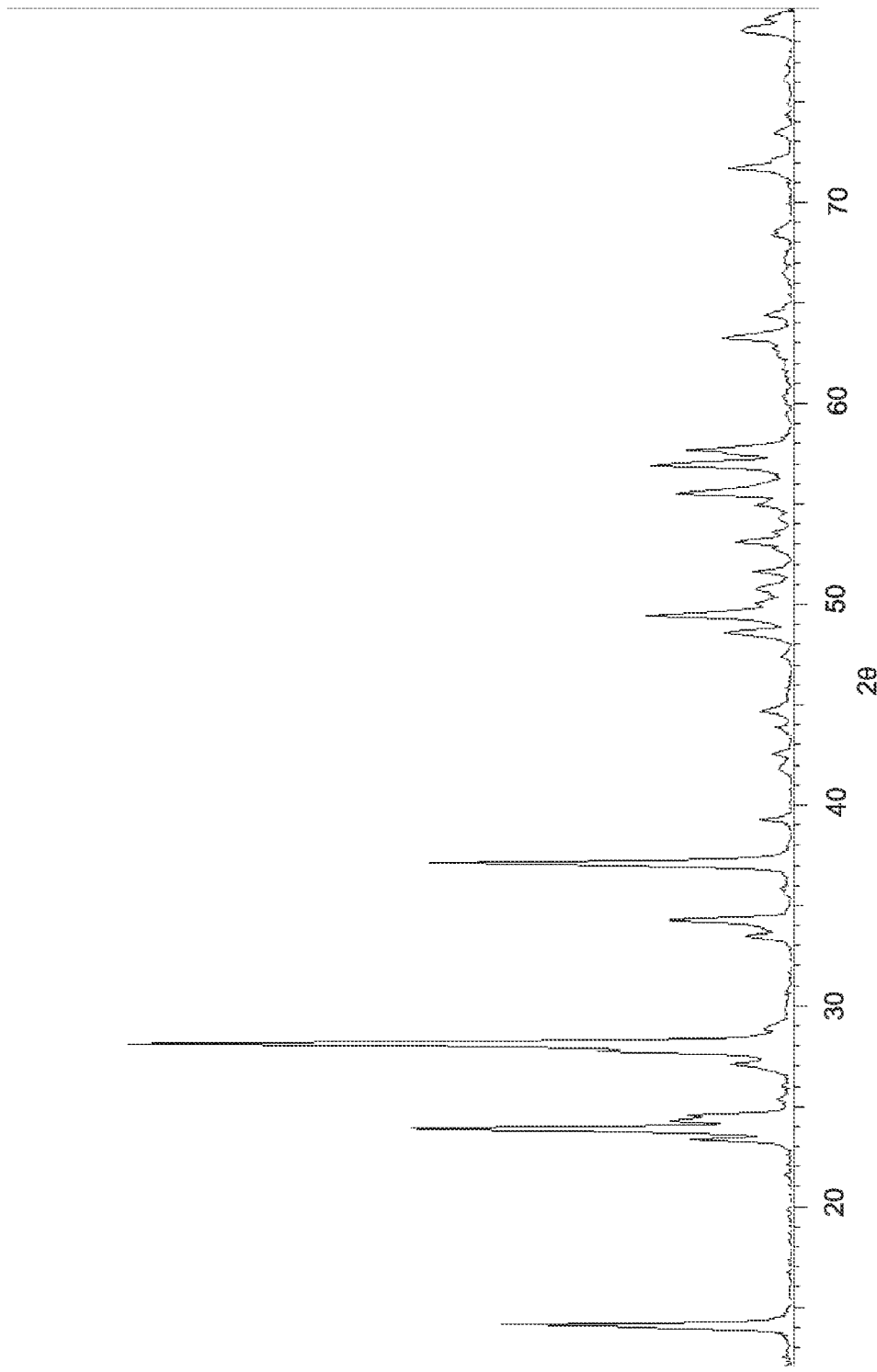

METHOD FOR OXIDIZING CARBONACEOUS MATERIAL DIESEL PARTICULATE FILTER AND EXHAUST GAS SYSTEM

BACKGROUND

Embodiments of the present invention relate to methods for oxidizing carbonaceous materials and associated diesel particulate filters and exhaust gas systems.

Carbonaceous materials, such as coal, oil (e.g., diesel oil), and wood, are usually oxidized to produce energy. Sometimes, the incomplete oxidization of the carbonaceous material yields soot, which still mainly consists of carbon and is undesirable in view of environment protection. Therefore, the decrease/elimination of soot discharge is one of the lasting concerns of the public, especially in the diesel engine industry, in which the decrease/elimination of soot discharge constitutes one of the limiting factors for its development.

One approach to reduce/eliminate the soot emission of a diesel engine is the employment of a diesel particulate filter in the exhaust gas system of the diesel engine to capture and oxidize the soot from the exhaust gas. Various catalysts are developed for oxidizing soot in the diesel particulate filter.

For example, U.S. Pat. No. 7,797,931 discloses a catalyst composition for use on a diesel particulate filter for facilitating soot oxidation comprising a catalytic metal comprising a platinum group metal selected from Pt, Pd, Pt—Pd, and combinations thereof. The cost of the platinum group metals is high.

Other currently available methods for oxidizing carbonaceous materials and associated diesel particulate filters and exhaust gas systems do not satisfactorily meet the existing needs either, so it is desirable to develop a new method for oxidizing carbonaceous material and associated diesel particulate filter and exhaust gas system.

BRIEF DESCRIPTION

In one aspect, an embodiment of the invention relates to a method for oxidizing a carbonaceous material comprising: contacting the carbonaceous material with an effective amount of a catalytic material of formula $A_xM_yWO_z$; and initiating the oxidization of the carbonaceous material at a first temperature lower than a second temperature at which the carbonaceous material is initiated to oxidize without a catalyst; wherein A is at least one of cesium and potassium; M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth; $0 \le x \le 1$; $0 \le y \le 1$; $2.2 \le z \le 3$; when $x=0$, $y>0$; and when $y=0$, $x>0$.

In another aspect, an embodiment of the invention relates to a diesel particulate filter for receiving diesel exhaust gas from a diesel engine and comprising a catalytic material of formula $A_xM_yWO_z$; wherein A is at least one of cesium and potassium; M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth; $0 \le x \le 1$; $0 \le y \le 1$; $2.2 \le z \le 3$; when $x=0$, $y>0$; and when $y=0$, $x>0$.

In yet another aspect, an embodiment of the invention relates to an exhaust gas system comprising a diesel particulate filter for receiving diesel exhaust gas from a diesel engine and comprising a catalytic material of formula $A_xM_yWO_z$; wherein A is at least one of cesium and potassium; M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth; $0 \le x \le 1$; $0 \le y \le 1$; $2.2 \le z \le 3$; when $x=0$, $y>0$; and when $y=0$, $x>0$.

DRAWINGS

These and other features, aspects, and advantages of the present invention will become better understood when the following detailed description is read with reference to the accompanying drawings, wherein:

FIG. 2B shows the X-ray diffraction (XRD) pattern in 2-theta-scale of $K_{0.1}WO_3$ of example 2;

Figure 4:
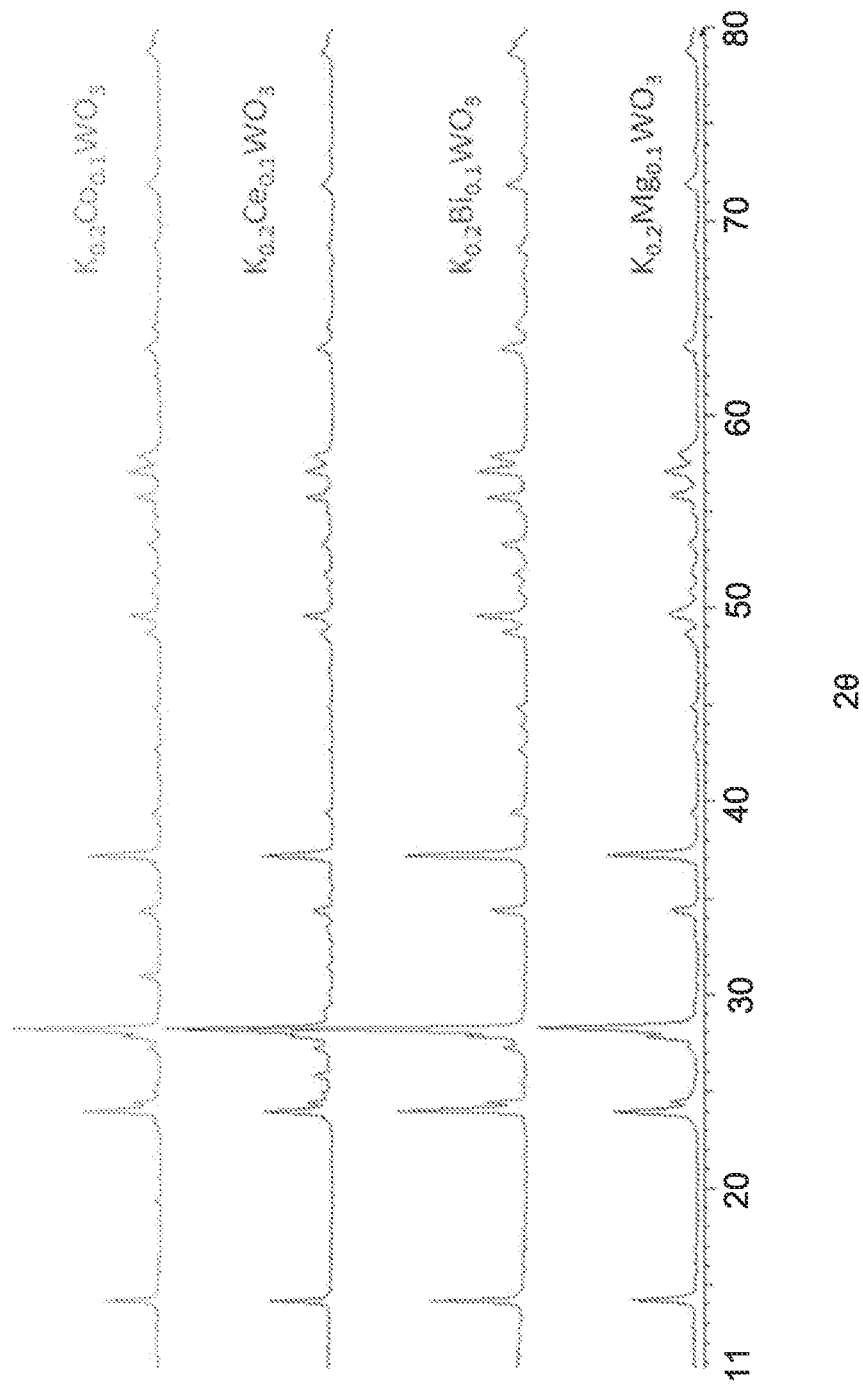
Figure 5:
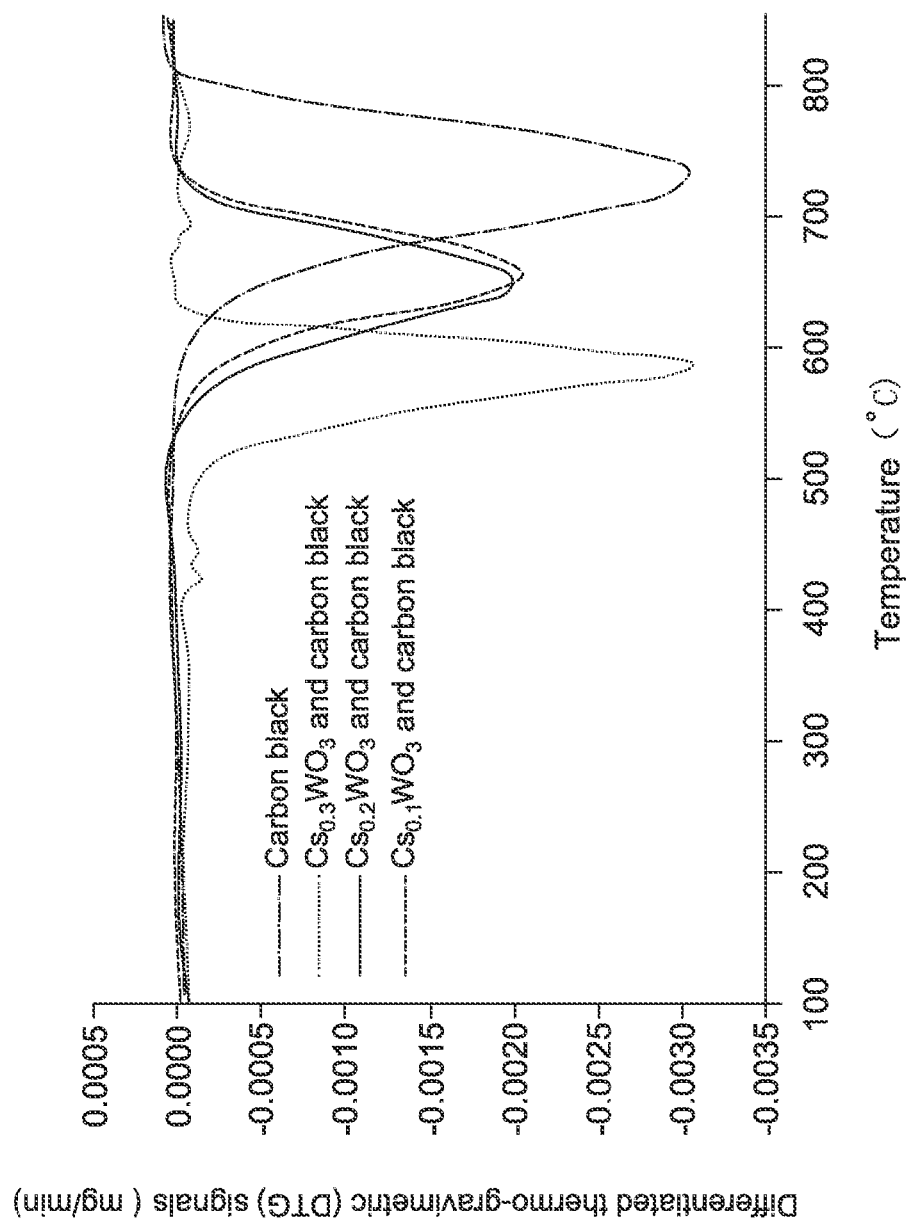
Figure 6:
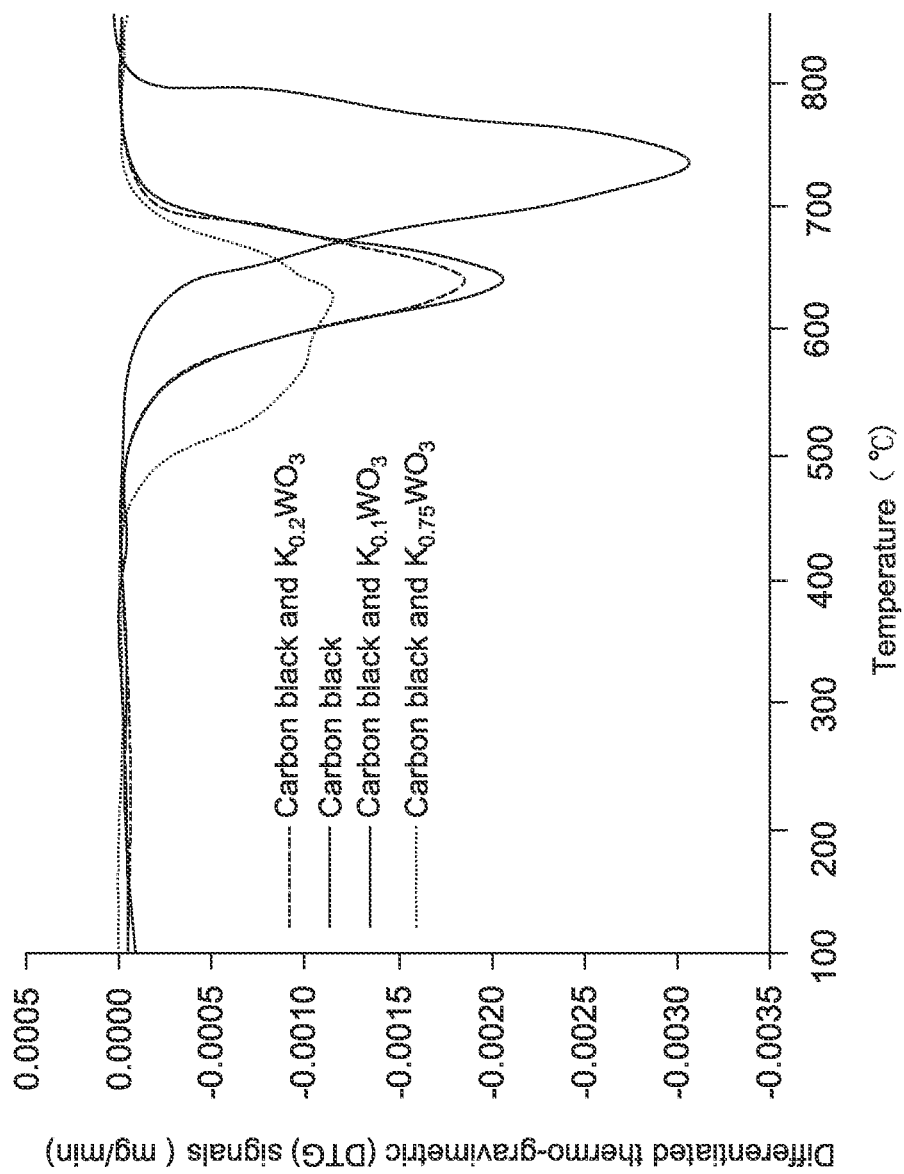
Figure 7:
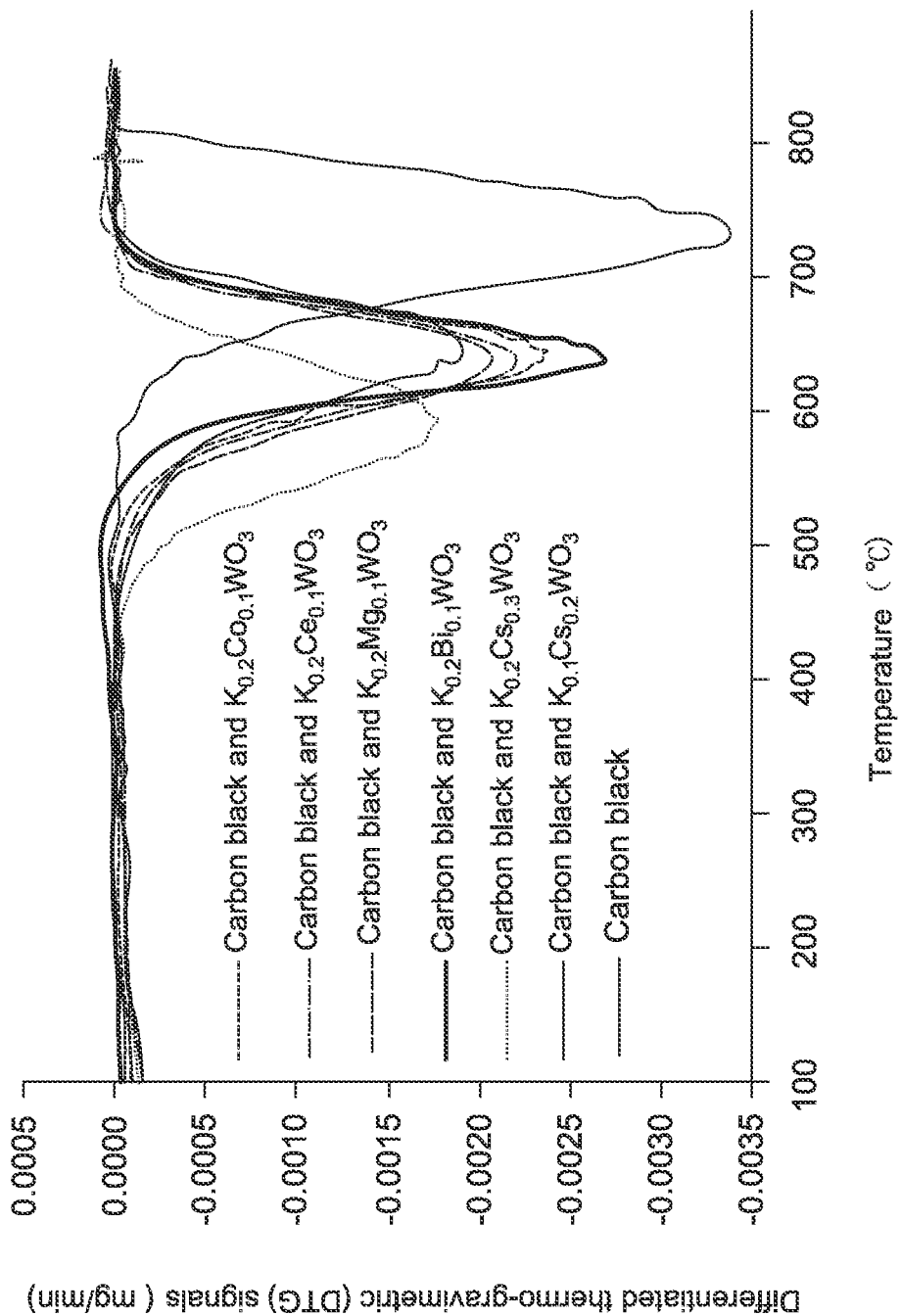

FIG. 4 shows X-ray diffraction (XRD) patterns in 2-theta-scale of $K_{0.2}Ce_{0.1}WO_3$, $K_{0.2}Mg_{0.1}WO_3$, $K_{0.2}Bi_{0.1}WO_3$, $K_{0.2}Co_{0.1}WO_3$ of example 4; and FIGS. 5, 6 and 7 show the differentiated thermo-gravimetric (DTG) signals of different samples at different temperatures of example 6.

DETAILED DESCRIPTION

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, more particularly from 20 to 80, more particularly from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the terms "may", "could", "could be" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may", "could", "could be" and "may be".

As used herein the term "carbonaceous material" refers to but is not limited to carbonaceous solid or liquid, or particulates or macromolecules forming the carbonaceous solid or liquid, which are derived from coal, petroleum, wood, hydrocarbons and other materials containing carbon. For example, the carbonaceous material may comprise at least one of hydrocarbon, carbon black and soot.

In some embodiments, the catalytic material of formula $A_xM_yWO_z$ is a crystal material. In some embodiments, the catalytic material of formula $A_xM_yWO_z$ has a hexagonal crystal structure. In some embodiments, the catalytic material has a hexagonal tungsten bronze crystal structure.

According to embodiments of the present invention, the catalytic material of formula $A_xM_yWO_z$ may be any composite oxide materials having different compositions. In some embodiments, A is potassium, y=0, and $0<x\le0.75$. In some embodiments, M is cesium, x=0 and $0<y\le0.75$. In some embodiments, A is potassium, M is cesium, $0<x\le0.75$ and $0<y\le0.75$. In some embodiments, A is potassium, M is cobalt, $0<x\le0.75$ and $0<y\le0.75$. In some embodiments, A is potassium, M is cerium, $0<x\le0.75$ and $0<y\le0.75$. In some embodiments, A is potassium, M is bismuth, $0<x\le0.75$ and $0<y\le0.75$. In some embodiments, A is potassium, M is magnesium, $0<x\le0.75$ and $0<y\le0.75$.

In some embodiments, the catalytic material comprises at least one of $Cs_{0.3}WO_3$, $Cs_{0.2}WO_3$, $Cs_{0.1}WO_3$, $K_{0.75}WO_3$, $K_{0.1}WO_3$, $K_{0.2}WO_3$, $K_{0.1}Cs_{0.2}WO_3$, $K_{0.2}Cs_{0.3}WO_3$, $K_{0.2}Co_{0.1}WO_3$, $K_{0.2}Ce_{0.1}WO_3$, $K_{0.2}Bi_{0.1}WO_3$, and $K_{0.2}Mg_{0.1}WO_3$.

The catalytic material of formula $A_xM_yWO_z$ may be formed by mixing a tungsten compound and a compound comprising A and/or M, and heat treating the mixture in an inert gas atmosphere and/or a reducing gas atmosphere.

The tungsten compound may be any one or more compounds selected from tungsten oxide, tungsten hexachloride, ammonium tungstenate, and metal tungsten.

The compound comprising A and/or M may be a compound comprising at least one of element A and element M, or two compounds respectively comprising element A and element M. In some embodiments, tungstenates, chloride salts, nitrates, sulfates, oxalates, oxides, carbonates, and hydroxides that contain element A and/or element M may be cited as examples of the compound comprising A and/or M, but these examples are not limiting.

The contacting of the carbonaceous material and the catalytic material of formula $A_xM_yWO_z$ may be in any ways. In some embodiments, the carbonaceous material and the catalytic material are mixed with each other. In some embodiments, the catalytic material of formula $A_xM_yWO_z$ is coated onto the walls of a diesel particulate filter which are exposed to the exhaust gas stream comprising the carbonaceous material so the two materials may be contacted with each other. In some embodiments, the catalytic material of formula $A_xM_yWO_z$ is mixed with diesel oil to contact with diesel oil and the incomplete combustion product thereof, soot.

The contacting may be in an environment comprising an oxidant, such as air, steam, nitrogen oxide(s), and oxygen.

As used herein the term "oxidizing carbonaceous material" refers to any procedure or condition to convert carbon in the carbonaceous material to carbon monoxide and/or carbon dioxide. As used herein the term "initiating the oxidization" refers to any acts that cause the carbon in the carbonaceous material start to convert from solid or liquid phases to gaseous phases. In some embodiments, the initial oxidization temperature of the carbonaceous material may be the lowest temperature that the carbonaceous material is able to oxidize in a certain environment, the temperature at which the carbonaceous material starts to generate carbon monoxide and/or carbon dioxide, the temperature at which the carbonaceous material starts to lose weight, or the temperature at which carbon monoxide and/or carbon dioxide generated from the carbonaceous material is detectable.

According to embodiments of the present invention, when the carbonaceous material is contacted with the catalytic material, the oxidization of the carbonaceous material is initiated at a first temperature lower than a second temperature at which the carbonaceous material is initiated to oxidize without the presence of a catalyst.

In some embodiments, the present invention relates to a diesel particulate filter comprising a catalytic material of formula $A_xM_yWO_z$. In some embodiments, the diesel particulate filter is used in the exhaust gas system of a diesel engine for receiving diesel exhaust gas. In some embodiments, the catalytic material is coated on the diesel particulate filter by way of immersing the diesel particulate filter in a slurry comprising the catalytic material and drying it after being taken out of the slurry.

EXAMPLES

The following examples are included to provide additional guidance to those of ordinary skill in the art in practicing the claimed invention. These examples do not limit the invention of the appended claims.

Example 1

Ammonium metatungstate hydrate (AMT, $(NH_4)_6H_2W_{12}O_{40}\cdot nH_2O$, 4.5060 g, white powder) was calcined in an oven of 800° C. for 3 hours. After calcination, 4.1202 g of yellow $WO_3$ powder was obtained. Therefore, there is 0.03944 mol of $WO_3$ in every 10 g of the AMT powder.

Figure 1:
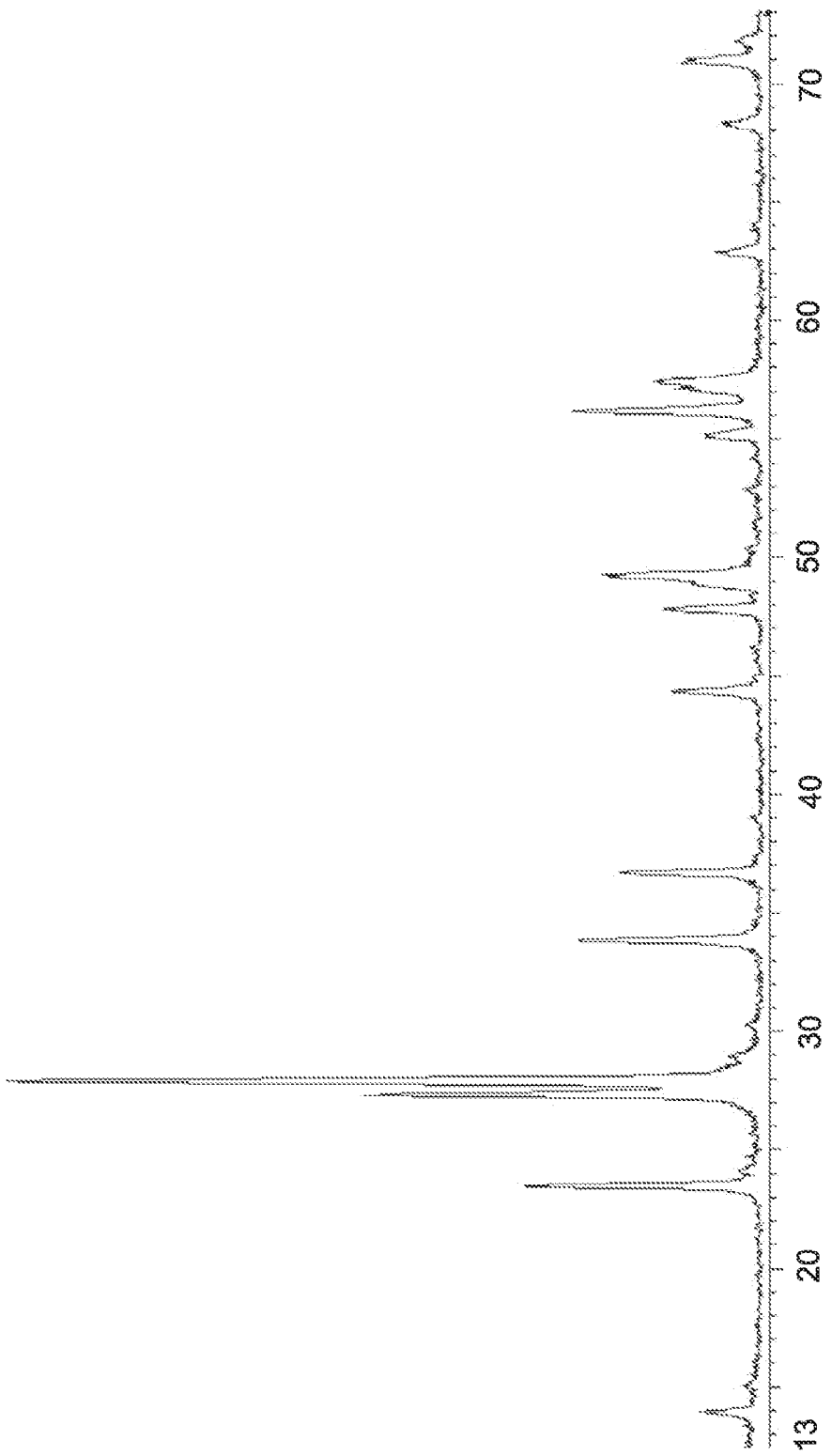
FIG. 1 shows the X-ray diffraction (XRD) pattern in 2-theta-scale of $Cs_{0.3}WO_3$ of example 1.

AMT powder (100 g) and corresponding amount of CsCl were weighed to prepare $Cs_{0.3}WO_3$, $Cs_{0.2}WO_3$, $Cs_{0.1}WO_3$, respectively. The AMT powder and CsCl were dissolved in de-ionized water completely and were placed in an oven of ~100° C. to vaporize water and collect a mixture powder after the removal of water. The mixture powder was placed in the tube furnace for reduction with the following temperature program: increasing the temperature to 450° C. within 1 hour in an $Ar/H_2$ (95%/5% in volume) atmosphere, maintaining this temperature for 2 hours in the $Ar/H_2$ atmosphere, and then shutting down the tube furnace and switching the atmosphere to an Ar atmosphere. After reduction, blue powders of $Cs_{0.3}WO_3$, $Cs_{0.2}WO_3$, $Cs_{0.1}WO_3$, were obtained. The X-ray diffraction (XRD) pattern of $Cs_{0.3}WO_3$ in FIG. 1 confirmed the hexagonal tungsten bronze (HTB) phase of $Cs_{0.3}WO_3$.

Example 2

Figure 2A:
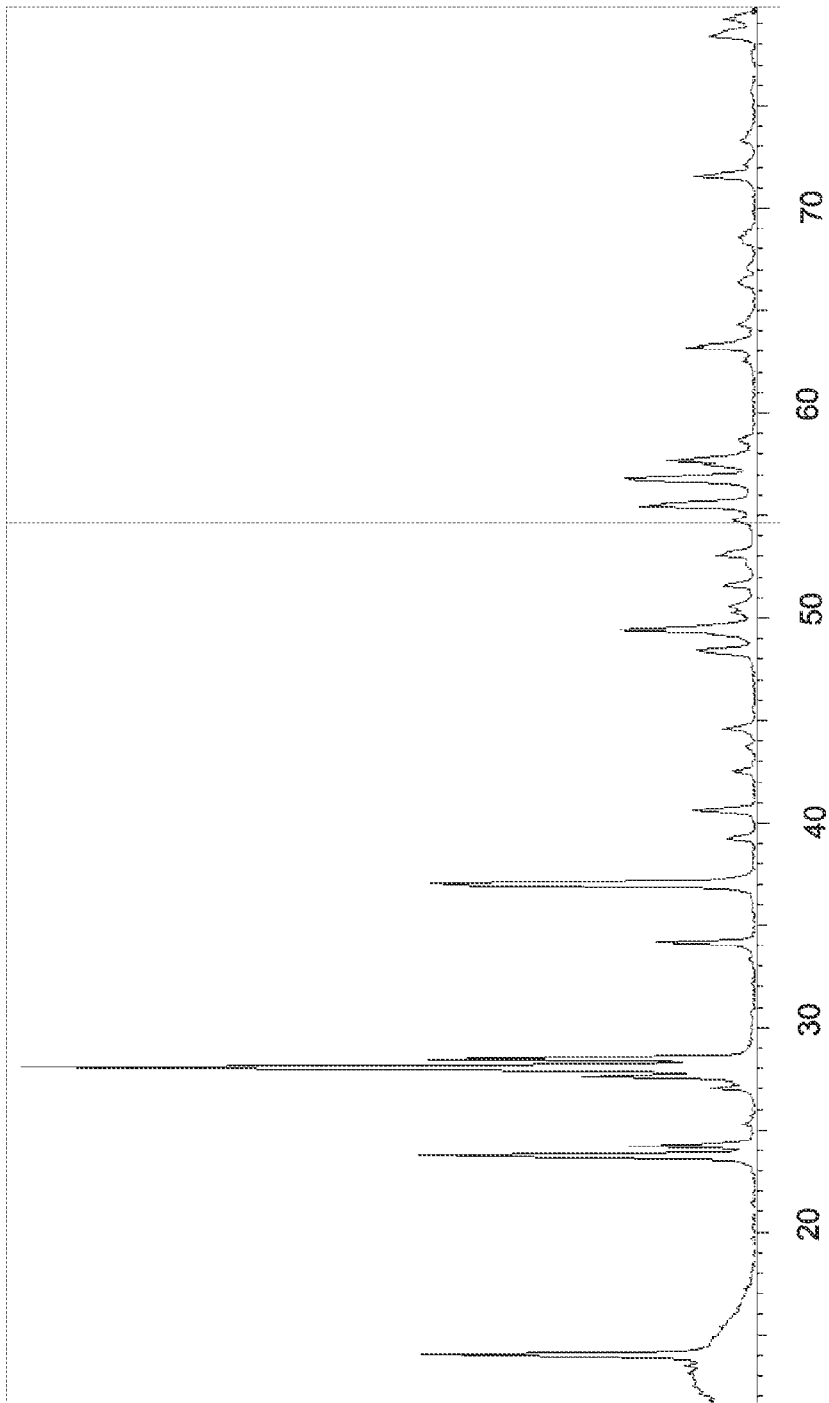
FIG. 2A shows the X-ray diffraction (XRD) pattern in 2-theta-scale of $K_{0.75}WO_3$ of example 2.
Figure 2C:
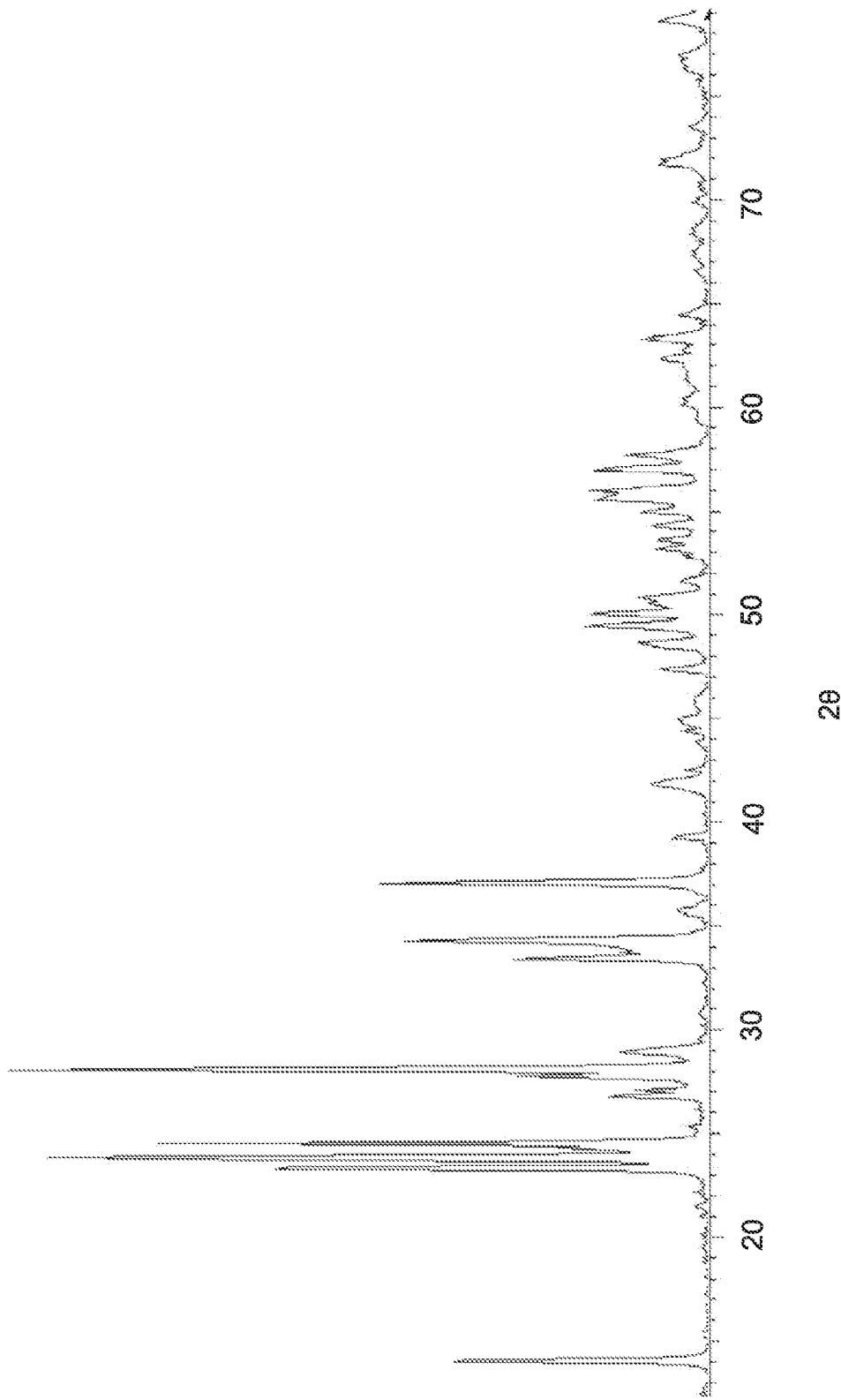
FIG. 2C shows the X-ray diffraction (XRD) pattern in 2-theta-scale of $K_{0.2}WO_3$ in example 2.

Following the same method mentioned above in example 1, while replacing CsCl with KCl to prepare $K_{0.75}WO_3$, $K_{0.1}WO_3$ and $K_{0.2}WO_3$, respectively. FIGS. 2A, 2B and 2C show the corresponding XRD patterns in 2-theta-scale of $K_{0.75}WO_3$, $K_{0.1}WO_3$ and $K_{0.2}WO_3$, respectively, confirming hexagonal tungsten bronze (HTB) phases of $K_{0.75}WO_3$, $K_{0.1}WO_3$ and $K_{0.2}WO_3$.

Example 3

Figure 3A:
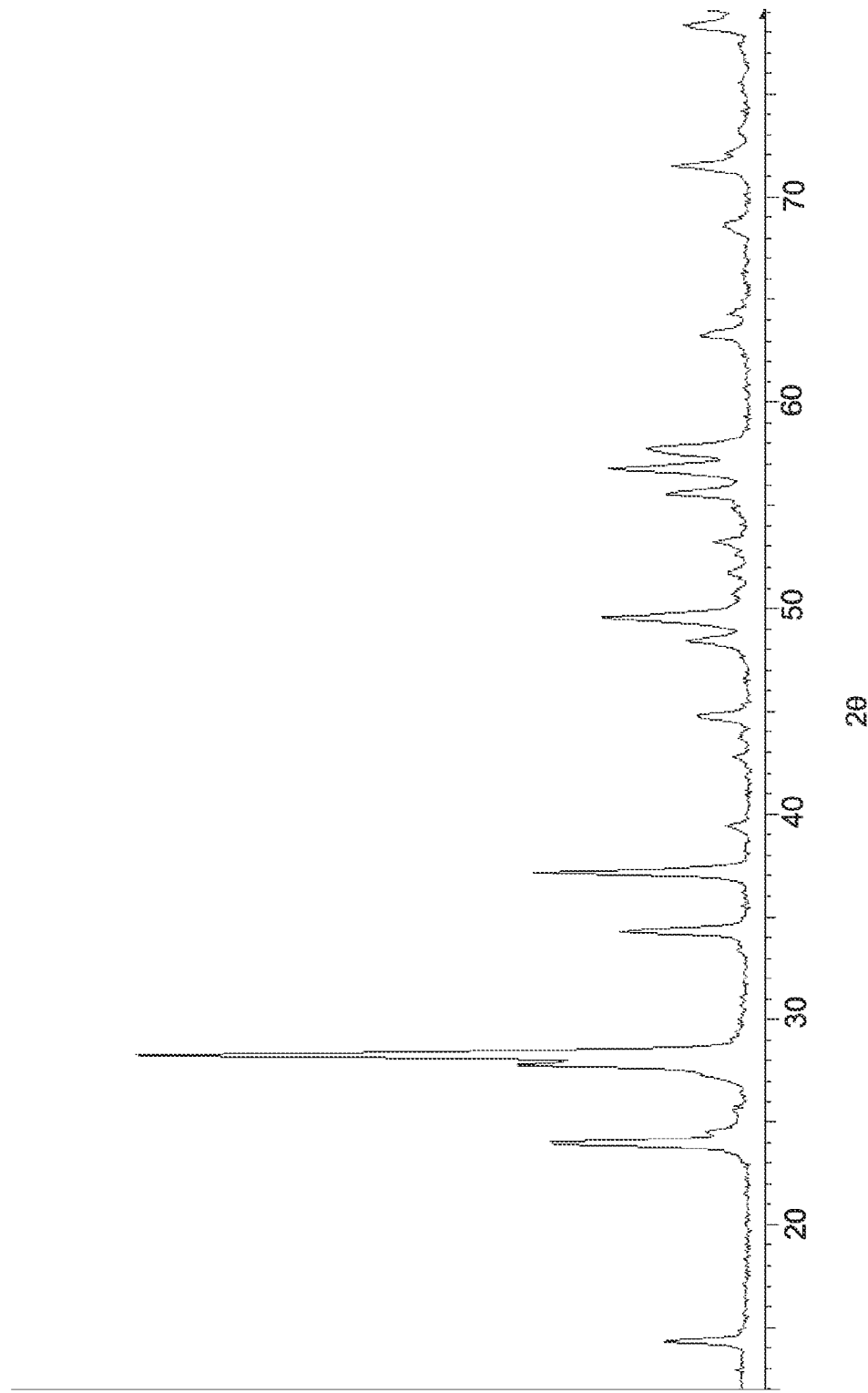
FIG. 3A shows the X-ray diffraction (XRD) pattern in 2-theta-scale of $K_{0.1}Cs_{0.2}WO_3$ of example 3.
Figure 3B:
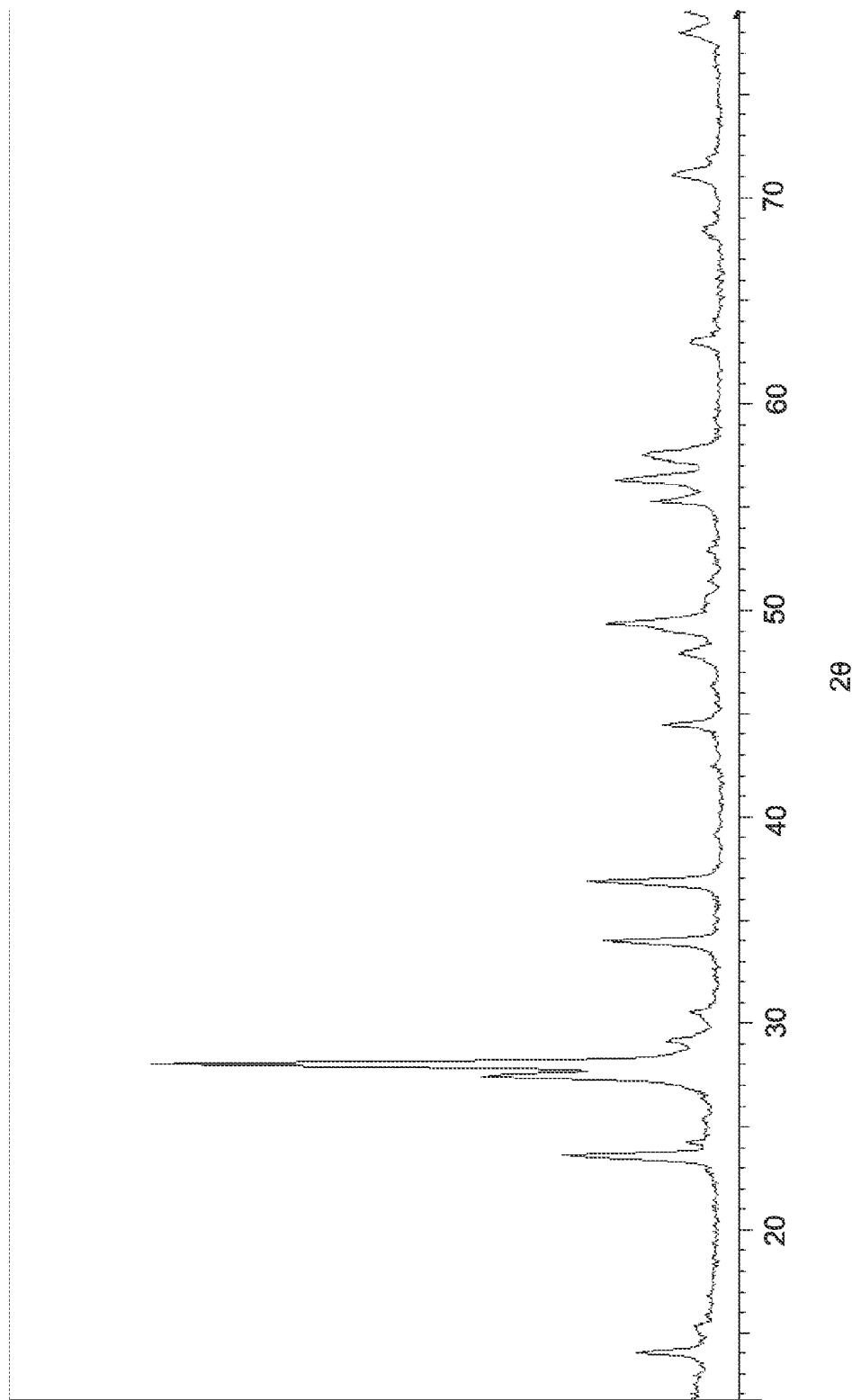
FIG. 3B shows the X-ray diffraction (XRD) pattern in 2-theta-scale of $K_{0.2}Cs_{0.3}WO_3$ of example 3.

Following the same method mentioned above in example 1, while replacing CsCl with the mixture of KCl and CsCl to prepare $K_{0.1}Cs_{0.2}WO_3$ and $K_{0.2}Cs_{0.3}WO_3$. FIGS. 3A and 3B respectively show XRD patterns in 2-theta-scale of $K_{0.1}Cs_{0.2}WO_3$ and $K_{0.2}Cs_{0.3}WO_3$, confirming hexagonal tungsten bronze (HTB) phases of $K_{0.1}Cs_{0.2}WO_3$ and $K_{0.2}Cs_{0.3}WO_3$.

Example 4

Following the same method mentioned above in example 1, while replacing CsCl with the mixture of $Ce(NO_3)_3$ and KCl, the mixture of $MgCl_2$ and KCl, the mixture of $Bi(NO_3)_3$ and KCl, and the mixture of $Co(NO_3)_2$ and KCl, respectively, to prepare $K_{0.2}Ce_{0.1}WO_3$, $K_{0.2}Mg_{0.1}WO_3$, $K_{0.2}Bi_{0.1}WO_3$, $K_{0.2}Co_{0.1}WO_3$, respectively. FIG. 4 shows the XRD patterns in 2-theta-scale of $K_{0.2}Ce_{0.1}WO_3$, $K_{0.2}Mg_{0.1}WO_3$, $K_{0.2}Bi_{0.2}WO_3$, $K_{0.2}Co_{0.1}WO_3$, confirming hexagonal tungsten bronze (HTB) phases of $K_{0.2}Ce_{0.1}WO_3$, $K_{0.2}Mg_{0.1}WO_3$, $K_{0.2}Bi_{0.1}WO_3$, $K_{0.2}Co_{0.1}WO_3$.

Example 5

A sample of $K_{0.75}WO_3$ obtained in example 2 was dissolved in water, heated at 80° C. for 1 hour, and filtered to yield solid $K_{0.75}WO_3$ before drying the solid $K_{0.75}WO_3$ at 105° C. for 1 hour.

Example 6

Catalytic performances of the catalysts obtained in examples 1-5 were evaluated by temperature programmed oxidation (TPO) of carbon black in TGA furnace (Mettler Toledo TGA/SDTA 851e). The carbon black was obtained from Synthetic Oils & Lubricants of TEXS. Inc. (99.99% carbon content of ACE Black AB 50).

The catalysts and carbon black were dried at 105° C. for 1 hour before being ground in an agate mortar with a weight ratio of 10 to 1 to obtain samples of mixtures of the catalysts and carbon black. Around 22 mg of each sample was placed in the TGA furnace and swept by a constant air flow of 80 ml/min. Carbon black samples (around 22 mg each) were also put in the same TGA furnace.

During the test, the samples were kept in crucibles and held for 10 minutes at 100° C. before being heated to 850° C. at a programmed temperature rise of 5° C./min. Corresponding weight variances (i.e., the thermo-gravimetric curve) were recorded automatically in the whole test.

Differentiated thermo-gravimetric (DTG) signals of $Cs_{0.3}WO_3$, $Cs_{0.2}WO_3$ and $Cs_{0.1}WO_3$ are illustrated in FIG. 5, which shows that $Cs_{0.3}WO_3$ started oxidation at about 470° C. which was about 100° C. lower than the initial oxidation temperature of pure carbon black. The initial oxidation temperature of $Cs_{0.2}WO_3$ and $Cs_{0.1}WO_3$ were about 515° C. and about 525° C., respectively.

Initial oxidation temperatures of $K_{0.75}WO_3$ (obtained in example 5), $K_{0.1}WO_3$, and $K_{0.2}WO_3$ can be seen from FIG. 6 which shows that $K_{0.75}WO_3$ (obtained in example 5) had the lowest initial oxidation temperature of 450° C. and the more potassium, the lower the initial oxidation temperature is.

DTG signals of carbon black, mixtures of carbon black with $K_{0.2}Ce_{0.1}WO_3$, $K_{0.2}Mg_{0.1}WO_3$, $K_{0.2}Bi_{0.1}WO_3$, $K_{0.2}Cs_{0.1}WO_3$ $K_{0.1}Cs_{0.2}WO_3$ and $K_{0.2}Cs_{0.3}WO_3$, respectively are present in FIG. 7, which shows that all the catalysts lowered the initial oxidation temperature of the carbon black.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for oxidizing a carbonaceous material, the method comprising:
   contacting the carbonaceous material with an effective amount of a catalytic material of formula $A_xM_yWO_z$; and
   initiating the oxidization of the carbonaceous material at a first temperature lower than a second temperature at which the carbonaceous material is initiated to oxidize without a catalyst, wherein:
   A is at least one of cesium and potassium;
   M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth;

$0 \leq x \leq 1$;

$0 \leq y \leq 1$;

$2.2 \leq z \leq 3$;

when x=0, y>0; and
   when y=0, x>0.

2. The method of claim 1, wherein the catalytic material comprises at least one of $Cs_{0.3}WO_3$, $Cs_{0.2}WO_3$, $Cs_{0.1}WO_3$, $K_{0.75}WO_3$, $K_{0.1}WO_3$, $K_{0.2}WO_3$, $K_{0.1}Cs_{0.2}WO_3$, $K_{0.2}Cs_{0.3}WO_3$, $K_{0.2}Co_{0.1}WO_3$, $K_{0.2}Ce_{0.1}WO_3$, $K_{0.2}Bi_{0.1}WO_3$, and $K_{0.2}Mg_{0.1}WO_3$.

3. The method of claim 1, wherein the catalytic material has a hexagonal tungsten bronze crystal structure.

4. The method of claim 1, wherein A is potassium, y=0, and $0<x \leq 0.75$.

5. The method of claim 1, wherein M is cesium, x=0, and $0<y \leq 0.75$.

6. The method of claim 1, wherein A is potassium, M is cesium, $0<x \leq 0.75$, and $0<y \leq 0.75$.

7. The method of claim 1, wherein A is potassium, M is cobalt, $0<x \leq 0.75$, and $0<y \leq 0.75$.

8. The method of claim 1, wherein A is potassium, M is cerium, $0<x \leq 0.75$, and $0<y \leq 0.75$.

9. The method of claim 1, wherein A is potassium, M is bismuth, $0<x\leq0.75$, and $0<y\leq0.75$.

10. The method of claim 1, wherein A is potassium, M is magnesium, $0<x\leq0.75$, and $0<y\leq0.75$.

11. The method of claim 1, wherein the contacting is in an environment comprising an oxidant.

12. The method of claim 1, wherein the carbonaceous material comprises at least one of carbon black, hydrocarbon and soot.

13. A diesel particulate filter for receiving diesel exhaust gas from a diesel engine, the diesel particulate filter comprising:
a catalytic material of formula $A_xM_yWO_z$,
wherein:
A is at least one of cesium and potassium;
M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth;

$0\leq x\leq 1$;

$0\leq y\leq 1$;

$2.2\leq z\leq 3$;

when $x=0$, $y>0$; and
when $y=0$, $x>0$.

14. The diesel particulate filter of claim 13, wherein the catalytic material comprises at least one of $Cs_{0.3}WO_3$, $Cs_{0.2}WO_3$, $Cs_{0.1}WO_3$, $K_{0.75}WO_3$, $K_{0.1}WO_3$, $K_{0.2}WO_3$, $K_{0.1}Cs_{0.2}WO_3$, $K_{0.2}Cs_{0.3}WO_3$, $K_{0.2}Co_{0.1}WO_3$, $K_{0.2}Ce_{0.1}WO_3$, $K_{0.2}Bi_{0.1}WO_3$, and $K_{0.2}Mg_{0.1}WO_3$.

15. The diesel particulate filter of claim 13, wherein the catalytic material has a hexagonal tungsten bronze crystal structure.

16. The diesel particulate filter of claim 13, wherein A is potassium.

17. The diesel particulate filter of claim 13, wherein M is cesium.

18. The diesel particulate filter of claim 13, wherein A is potassium and M is at least one of cesium, cobalt, cerium, bismuth and magnesium.

19. The diesel particulate filter of claim 13, wherein the diesel exhaust gas comprises soot.

20. An exhaust gas system, comprising:
a diesel particulate filter for receiving diesel exhaust gas from the diesel engine, wherein the diesel particulate filter comprises:
a catalytic material of formula $A_xM_yWO_z$,
wherein:
A is at least one of cesium and potassium;
M is different from A and is at least one of cesium, potassium, magnesium, calcium, strontium, barium, iron, cobalt, nickel, ruthenium, rhodium, palladium, silver, osmium, iridium, platinum, gold, yttrium, lanthanum, cerium, praseodymium, neodymium, promethium, samarium, europium, gadolinium, terbium, dysprosium, holmium, erbium, thulium, ytterbium, lutetium, and bismuth;

$0\leq x\leq 1$;

$0\leq y\leq 1$;

$2.2\leq z\leq 3$;

when $x=0$, $y>0$; and
when $y=0$, $x>0$.

* * * * *